(12) United States Patent
Graham

(10) Patent No.: US 10,604,125 B2
(45) Date of Patent: Mar. 31, 2020

(54) SUPPLEMENTAL BRAKE MONITORING SYSTEM

(71) Applicant: ROADMASTER, INC., Vancouver, WA (US)

(72) Inventor: Josh Graham, Vancouver, WA (US)

(73) Assignee: Roadmaster, Inc., Vancouver, WA (US)

( * ) Notice: Subject to any disclaimer, the term of this patent is extended or adjusted under 35 U.S.C. 154(b) by 214 days.

(21) Appl. No.: 15/822,410

(22) Filed: Nov. 27, 2017

(65) Prior Publication Data

US 2018/0148019 A1 May 31, 2018

Related U.S. Application Data

(60) Provisional application No. 62/426,753, filed on Nov. 28, 2016.

(51) Int. Cl.
| | |
|---|---|
| *B60T 7/04* | (2006.01) |
| *B60T 17/22* | (2006.01) |
| *B60T 7/06* | (2006.01) |
| *B60T 7/10* | (2006.01) |
| *B60T 7/20* | (2006.01) |
| *B60T 7/16* | (2006.01) |

(52) U.S. Cl.
CPC ............ *B60T 7/042* (2013.01); *B60T 7/06* (2013.01); *B60T 7/107* (2013.01); *B60T 7/16* (2013.01); *B60T 7/20* (2013.01); *B60T 17/221* (2013.01); *B60T 2220/04* (2013.01)

(58) Field of Classification Search
CPC ............ B60T 7/042; B60T 7/06; B60T 7/107
See application file for complete search history.

(56) References Cited

U.S. PATENT DOCUMENTS

| | | | | |
|---|---|---|---|---|
| 5,503,468 | A * | 4/1996 | Saffran | B60T 7/20 188/3 H |
| 6,050,649 | A * | 4/2000 | Hensley | B60Q 1/441 188/158 |
| 2018/0290635 | A1* | 10/2018 | Decker, Jr. | B60T 7/20 |

* cited by examiner

*Primary Examiner* — Michael D Lang
(74) *Attorney, Agent, or Firm* — Erise IP, P.A.

(57) ABSTRACT

A supplemental braking system for controlling the braking of a towed vehicle. a supplemental brake application apparatus, a supplemental braking monitor, and a transmitter. The supplemental brake application apparatus is configured to be installed in a towed vehicle. The supplemental brake application apparatus is configured to move a brake pedal of the towed vehicle between a first position and a second position. The supplemental braking monitor is also configured to be installed in the towed vehicle. The supplemental braking monitor includes a proximity sensor configured to produce a proximity detection signal, and a mounting plate configured to secure the proximity sensor in a position such that the proximity sensor can detect movement of the brake pedal. The proximity detection signal is based at least in part on movement of the brake pedal. The transmitter is configured to send a brake status signal to a towing vehicle.

20 Claims, 9 Drawing Sheets

SUPPLEMENTAL BRAKE MONITORING SYSTEM

RELATED APPLICATIONS

This non-provisional patent application claims priority benefit, with regard to all common subject matter, of earlier-filed U.S. Provisional Patent Application No. 62/426,753, filed on Nov. 28, 2016, and entitled "PROXIMITY SENSOR BASED SUPPLEMENTAL BRAKE MONITORING SYSTEM" (the '753 application). The '753 application is hereby incorporated by reference in its entirety into the present application.

Embodiments and/or features of the invention described in the present document may be used with the subject matter disclosed in commonly assigned and entitled "INTEGRALLY LIGHTED TOW BAR." The concurrently filed patent application claims priority to earlier-filed U.S. Provisional Patent Application No. 62/477,561, filed on Mar. 28, 2017, and entitled "INTEGRALLY LIGHTED TOW BAR." The concurrently filed patent application and the previously filed provisional application are each hereby incorporated by reference in their entirety into the present application.

BACKGROUND

1. Field

Embodiments of the invention are broadly directed to supplemental braking systems for controlling braking of a towed vehicle.

2. Related Art

Supplemental braking systems control the braking of a towed vehicle. Typically, a towing vehicle will proceed the towed vehicle during movement. The towing vehicle will be occupied by a driver, and the towed vehicle will be unoccupied (or have an occupant who is not a driver). When the driver applies the brake in the towing vehicle, the towed vehicle momentum causes strain on towing equipment, increases the stopping distance of the towing vehicle, and can cause the towed vehicle to leave an aligned configuration behind the towing vehicle, among other concerns.

In order to reduce this unsafe situation, supplemental braking systems have been developed that apply the brake in the towed vehicle upon the brake being applied in the towing vehicle. These supplemental braking systems reduce strain on the towing equipment, reduce stopping distance, and keep the towed vehicle aligned. In order to provide feedback to the driver of whether the brake of the towed vehicle was being applied, prior versions of a supplemental braking system integrated into the electrical system of the towed vehicle to monitor the brake lights of the towed vehicle. Integrating into the electrical system required a long and difficult installation process. Further, vehicle-specific components were required to integrate into the electrical system of different types of vehicles. What is lacking in the prior art is a supplemental braking system that is quick and easy to install in numerous types of towed vehicles.

SUMMARY

Embodiments of the invention solve these problems by providing a supplemental braking system that uses a proximity sensor to detect the location of the brake pedal in the towed vehicle. The proximity sensor detects the movement of the brake pedal to ensure that the supplemental braking system is operating correctly. This provides feedback to the driver in the towing vehicle that the supplemental braking system is being applied when desired, and the supplemental braking system is not being applied when not desired. By monitoring the location of the brake pedal of the towed vehicle, the actual braking of the vehicle can be monitored.

A first embodiment of the invention is broadly directed to a supplemental braking system comprising a supplemental brake application apparatus, a supplemental braking monitor, and a transmitter. The supplemental brake application apparatus is configured to be installed in a towed vehicle. The supplemental brake application apparatus is configured to move a brake pedal of the towed vehicle between a first position and a second position. The supplemental braking monitor is also configured to be installed in the towed vehicle. The supplemental braking monitor includes a proximity sensor configured to produce a proximity detection signal, and a mounting plate configured to secure the proximity sensor in a position such that the proximity sensor can detect movement of the brake pedal. The proximity detection signal is based at least in part on movement of the brake pedal. The transmitter is configured to send a brake status signal to a towing vehicle. The brake status signal is based at least in part on the proximity detection signal.

A second embodiment of the invention is broadly directed to a supplemental braking monitor configured to be installed in the towed vehicle. The supplemental braking monitor comprises a proximity sensor and a mounting plate. The proximity sensor is configured to produce a proximity detection signal. The mounting plate configured to secure the proximity sensor in a position such that the proximity sensor can detect movement of a brake pedal of the towed vehicle. The proximity detection signal is produced at least in part based on movement of the brake pedal of the towed vehicle.

A third embodiment of the invention is broadly directed to a supplemental braking system comprising a supplemental brake application apparatus and a supplemental braking monitor. The supplemental brake application apparatus is configured to be installed in a towed vehicle. The supplemental brake application apparatus is configured to move a brake pedal of the towed vehicle between a first position and a second position. The supplemental braking monitor is configured to be installed in the towed vehicle. The supplemental braking monitor includes a proximity sensor and a mounting plate. The proximity sensor is configured to produce a proximity detection signal. The mounting plate is configured to secure the proximity sensor in a position such that the proximity sensor can detect movement of the brake pedal. The proximity detection signal is based at least in part on movement of the brake pedal.

Additional embodiments of the invention may be directed to various methods. For example, a fourth embodiment of the invention is directed to a method of installing a supplemental braking system into a towed vehicle. As another example, a fifth embodiment of the invention is directed to a method of installing a supplemental brake application apparatus into a towed vehicle. As yet another example, a sixth embodiment of the invention is directed to a method of installing a supplemental braking monitor into a towed vehicle. A seventh embodiment of the invention is directed to a method of generating and presenting a brake status indication to a driver in a towing vehicle.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
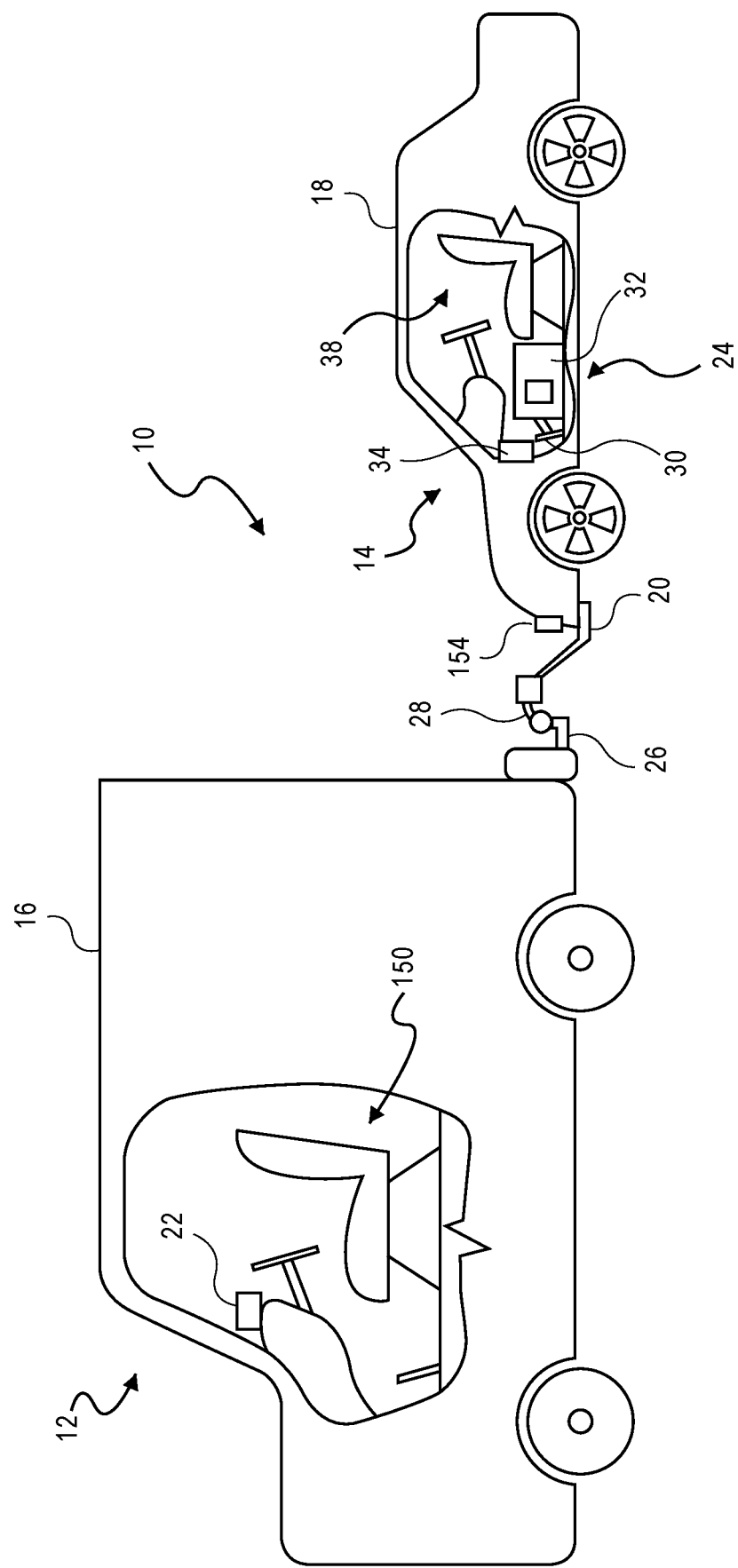
FIG. 1 is a schematic drawing showing a towing vehicle and a towed vehicle with a supplemental braking system therein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense.

In this description, references to "one embodiment", "an embodiment", "embodiments", "various embodiments", "certain embodiments", "some embodiments", or "other embodiments" mean that the feature or features being referred to are included in at least one embodiment of the technology. Separate references to "one embodiment", "an embodiment", "embodiments", "various embodiments", "certain embodiments", "some embodiments", or "other embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Turning to FIG. 1, a towing system 10 is shown. The towing system 10 is configured to allow a towing vehicle 12 to tow, pull, push, or otherwise move a towed vehicle 14. A driver is within, controlling, or otherwise associated with the towing vehicle 12. The towed vehicle 14 is at least partially passive, being towed pulled, pushed or otherwise moved by the towing vehicle 12. The towed vehicle 14 may include neither a driver or passenger, or may include a passive passenger.

A few exemplary fields of use will briefly be discussed. However, it should be appreciated that embodiments of the invention may be utilized in or configured for other fields of use. One potential field of use for embodiments of the invention is in the field of recreational vehicles (also know as "RVs"). In this field, a recreational vehicle 16 may perform functions as the towing vehicle 12 and an automobile 18 may perform functions as the towed vehicle 14. The recreational vehicle 16 tows the automobile 18 such that the driver may have the option of driving only the automobile 18 upon reaching a destination. Another exemplary field of use for embodiments of the invention may be semi-trailer trucking. In this field, a tractor (which may be known as a semi, tractor-trailer, big rig, or eighteen-wheeler) performs functions as the towing vehicle 12 and a semi-trailer performs functions as the towed vehicle 14. Another exemplary field of use for embodiments of the invention may be general towing. In this field, a pickup truck, sport utility vehicle, or other automobile 18 may perform functions as the towing vehicle 12. A trailer may perform functions as the towed vehicle 14. Additional fields may be directed to construction vehicles, watercraft, aircraft, and other vehicles.

The towing system 10 includes various components to allow the towing vehicle 12 to tow the towed vehicle 14. In embodiments of the invention, the towing system 10 includes a tow bar 20, a towing monitor 22, and a supplemental braking system 24. The tow bar 20 is configured to be secured between the towing vehicle 12 and the towed vehicle 14. The supplemental braking system 24 is disposed in, or otherwise associated with, the towed vehicle 14 to supply brakes to the towed vehicle 14 during brake application to the towing vehicle 12. The towing monitor 22 is disposed in, or otherwise associated with, the towing vehicle 12 to monitor the operation of the supplemental braking system 24, as demonstrated as in the physical movement of the brake pedal 30 in the towed vehicle 14.

The tow bar 20 is detachably coupled to the towed vehicle 14 and to the towing vehicle 12. The tow bar 20 exerts a force of the towed vehicle 14. The tow bar 20 has a hitch attachment 26 that is detachably attaches to a coupler 28 mounted on the rear of the towing vehicle 12. The tow bar 20 also prevents the towed vehicle 14 from striking the towing vehicle 12 while the towing vehicle 12 is braking. The braking of the towing vehicle 12 exerts a force on the tow bar 20 from the inertia of the towed vehicle 14. The inertia is dispersed by also applying the brake in the towed vehicle 14 while the brake is applied in the towing vehicle 12.

Figure 2:
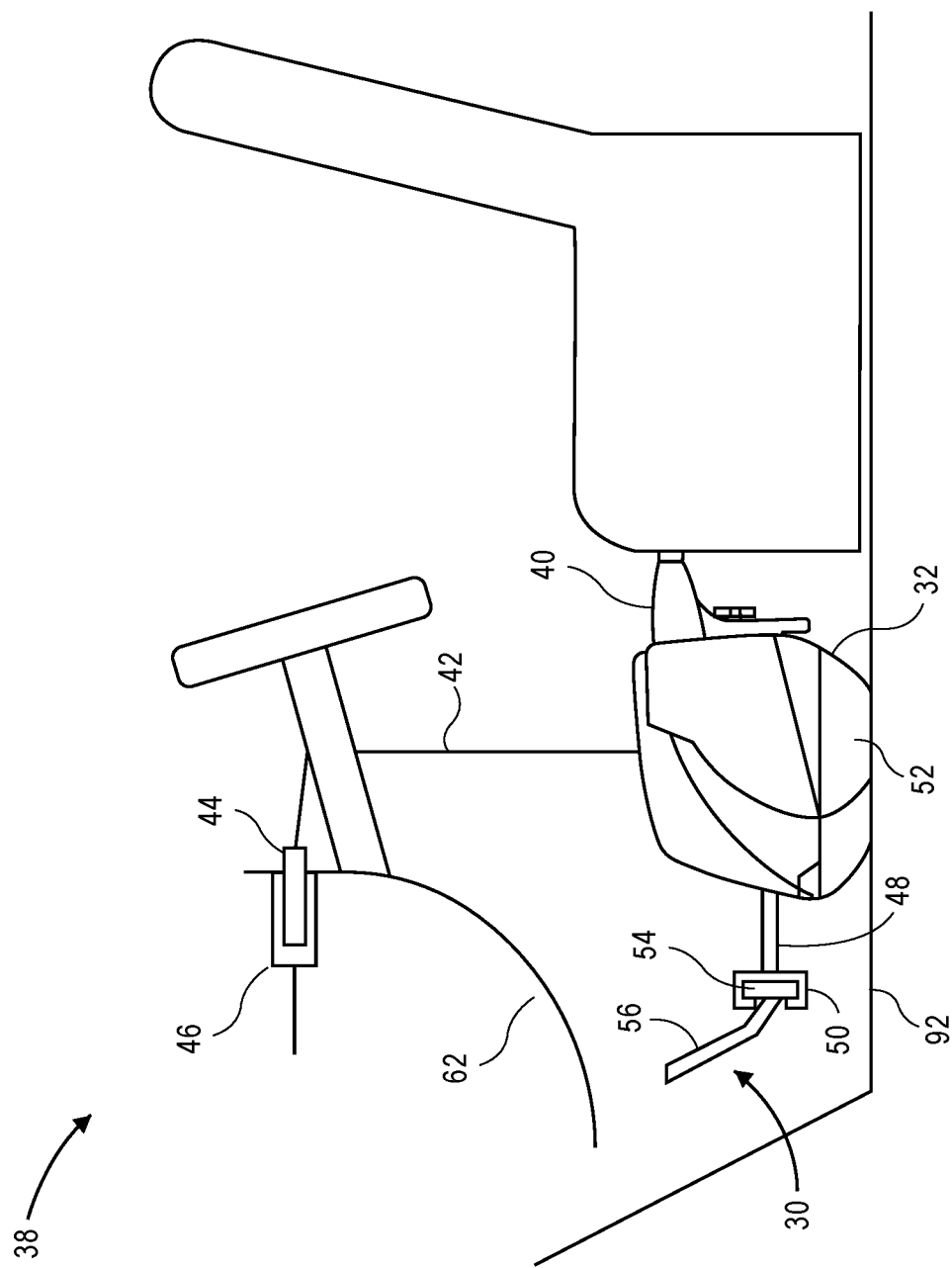
FIG. 2 is a schematic drawing showing a first embodiment of a supplemental braking application apparatus.

The towing system 10 further comprises the supplemental braking system 24 that is placed in the towed vehicle 14. The supplemental braking system 24 applies the brake to the towed vehicle 14 in conjunction with the driver applying the brake to the towing vehicle 12, and provides an indication of such supplemental braking to the driver in the towing vehicle 12 via the towing monitor 22. In some embodiments, the supplemental braking system 24 may be easily removable, such as shown in FIG. 2. In other embodiments, the supplemental braking system 24 may be more permanently mounted, such as the cable-actuated system shown in FIG. 3. In still other embodiments, the supplemental braking system 24 may apply force directly to the towed vehicle 14 brake pedal 30, powered and controlled by connecting directly into an air or hydraulic brake system of the towing vehicle 12. It should be appreciated that other embodiments of the invention may be utilized in conjunction with other supplemental braking systems 24.

Before discussing the components in more depth, typical operation of the supplemental braking system 24 will be discussed to orient the reader. It should be appreciated that various embodiments of the invention may operate in other ways and that the following description is exemplary. The supplemental braking system 24 is configured to actuate a brake pedal 30 of the towed vehicle 14 at certain times when it receives signals to do so. Typically, such signals come on wires run from the towing vehicle 12, typically from the brake lights of the towing vehicle 12. Alternatively, signals to actuate the towed vehicle 14 brake pedal 30 may come from inertial sensors, or sensors that tap into hydraulic or air brake lines on the towing vehicle 12. When the brake lights of the towing vehicle 12 are on, a signal is sent to the supplemental braking system 24 to actuate the brakes of the towed vehicle 14. The typical sequence is the brake pedal 30 of the towing vehicle 12 is depressed by the driver, which applies the brakes of the towing vehicle 12, which is sensed by the supplemental braking system 24 which then causes the brakes of the towed vehicle 14 to be applied. This supplemental braking capacity gives the towing system 10 greater braking ability and allows the combined vehicles to stop faster and with better control than with just the brakes of the towing vehicle 12.

In embodiments of the invention, the supplemental braking system 24 comprises a supplemental brake application apparatus 32, a supplemental braking monitor 34, and a transmitter 36. The supplemental braking application apparatus 32 actuates the brake system of the towed vehicle 14. The supplemental braking monitor 34 monitors the brake system of the towed vehicle 14 to determine if the supplemental braking application apparatus 32 is successfully actuating the brake system of the towed vehicle 14. The transmitter 36 sends a brake status signal indicative of the actuation status of the brake pedal 30. The brake status signal may be received by the towing monitor 22 in the towing vehicle 12, which provides an indication to the driver.

Figure 3:
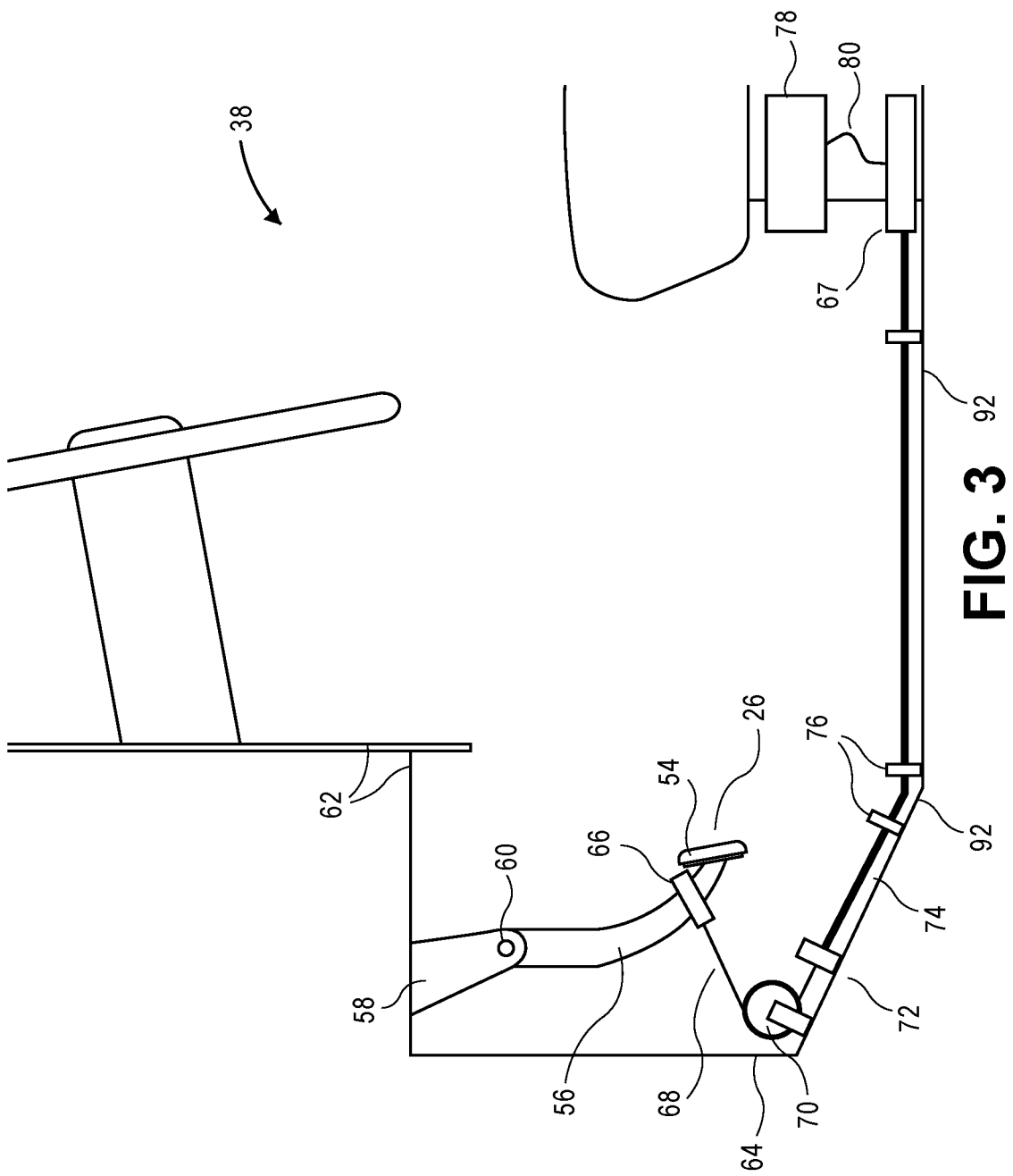
FIG. 3 is a schematic drawing showing a second embodiment of the supplemental braking application apparatus.

In embodiments of the invention, the supplemental brake application apparatus 32 is configured to be installed in the towed vehicle 14. In some embodiments, the supplemental braking application apparatus 32 is configured to be non-permanently installed so that the supplemental braking application apparatus 32 is easily removable (as illustrated in FIG. 2 and discussed in more depth below). In other embodiments, the supplemental braking application apparatus 32 is configured to be permanently installed (as illustrated in FIG. 3 and discussed in more depth below) such that the towed vehicle 14 may be driven by a driver while the supplemental braking application apparatus 32 is not being utilized. For example, the towed vehicle 14 may be a car pulled behind an RV, such that the car may be driven independently by the driver upon parking and disconnecting the RV (as illustrated in FIG. 1). This may be accomplished either removing the supplemental braking application apparatus 32 (in the exemplary embodiment shown in FIG. 2) or disconnecting the supplemental braking application apparatus 32 (in the exemplary embodiment shown in the FIG. 3).

The supplemental brake application apparatus 32 is configured to move a brake pedal 30 of the towed vehicle 14 between a first position and a second position. The first position is a default or unactuated position in which no braking motion is performed. The second position is a braking or actuated position in which the braking motion is performed. In some embodiments, the supplemental braking application apparatus 32 is configured to move the brake pedal 30 of the towed vehicle 14 to an intermediate position between the first position and the second position. The intermediate position is a partial braking or partially actuated position. In some embodiments, the supplemental braking application apparatus 32 is configured to move the brake pedal 30 of the towed vehicle 14 to a plurality of intermediate positions.

FIG. 2 shows an interior 38 of the towed vehicle 14 from the towing system 10 of FIG. 1 with a removable supplemental braking system 24. The supplemental brake application apparatus 32 has been placed in the towed vehicle 14 interior 38 in front of the driver's seat. In embodiments of the invention, the supplemental brake application apparatus 32 has a brace 40 to secure or otherwise keep the supplemental braking application apparatus 32 in place at the correct distance from the towed vehicle 14 brake pedal 30. The supplemental brake application apparatus 32 has a power cord 42 with an electrical connector 44 configured to connect into a socket 46 associated with the towed vehicle 14. The socket 46 connects to a battery power supply (not illustrated) of the towed vehicle 14. It should also be appreciated that various other components described herein may include the above discussed power components.

The supplemental brake application apparatus 32 has an actuator arm 48 with a brake pedal clamp 50. The brake pedal clamp 50 is configured for clamping around the towed vehicle 14 brake pedal 30. The actuator arm 48 is associated with an actuator (not illustrated) within a housing 52. The supplemental brake application apparatus 32 is configured for applying a force to the towed vehicle 14 brake pedal 30 with the actuator arm 48 upon receiving a signal to brake, moving the towed vehicle 14 brake pedal 30 forward, thereby actuating the brakes of the towed vehicle 14. The supplemental brake application apparatus 32 is configured for releasing the force applied by the actuator arm 48 when no signal to brake is being received, allowing the return of the towed vehicle 14 brake pedal 30 to move it backwards and release the brakes of the towed vehicle 14.

FIG. 3 shows the interior 38 of the towed vehicle 14 from the towing system 10 of FIG. 1 with a permanently mounted supplemental braking system 24. The permanently mounted supplemental braking system 24 is configured for actuating the towed vehicle 14 brake pedal 30 of the towed vehicle 14. The towed vehicle 14 brake pedal 30 comprises a brake pedal pad 54 and a brake pedal arm 56, with the brake pedal pad 54 coupled to the brake pedal arm 56. The brake pedal 30 is coupled to a brake pedal bracket 58 by a pivot pin 60, allowing the brake pedal 30 to rotate around the pivot pin 60. The brake pedal bracket 58 is mounted to the structure of the towed vehicle 14, either to an underside of a dashboard 62 or to a firewall 64 of the interior 38 of the towed vehicle 14. When a force is applied to the brake pedal pad 54 or the brake pedal arm 56 in the direction of the firewall 64, both the brake pedal pad 54 and the brake pedal arm 56 rotate around the pivot pin 60 and move towards the firewall 64.

The permanently mounted supplemental braking system 24 includes a brake arm clamp 66 connected to an actuator 67 by a cable 68. The brake arm clamp 66 is clamped to the brake pedal arm 56. The cable 68 runs from the brake arm clamp 66 around a pulley 70 mounted on the firewall 64, which redirects the force transmitted by the cable 68, through a cable anchor bracket 72 and a cable housing 74 to the actuator 67. The cable housing 74 is secured to the interior 38 by cable clamps 76. A brake controller 78 powers and controls the actuator 67 with compressed air through a connecting air line 80. The brake controller 78 is powered by a direct connection to the battery of the towed vehicle 14. The brake controller 78 is configured for applying a force to the towed vehicle 14 brake pedal 30 with the actuator 67 through the cable 68 upon the brake controller 78 receiving a signal to brake, moving the towed vehicle 14 brake pedal 30 forward, thereby actuating the brakes of the towed vehicle 14. The brake controller 78 is configured for releasing the force applied by the actuator 67 and cable 68 when no signal to brake is being received, allowing the return of the towed vehicle 14 brake pedal 30 to move it backwards and release the brakes of the towed vehicle 14.

Figure 4:
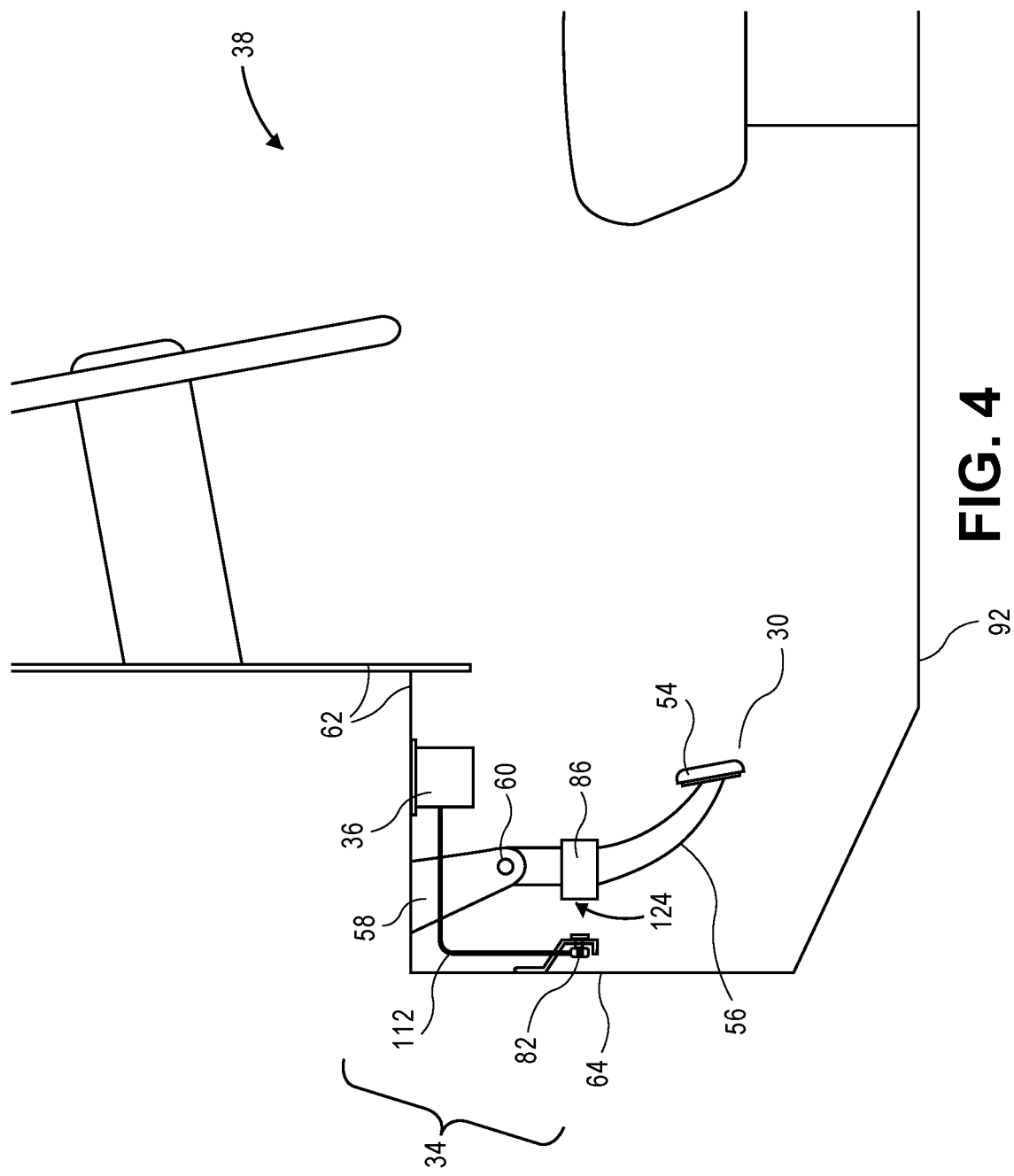
FIG. 4 is a schematic drawing showing a first embodiment of a supplemental brake monitor.
Figure 5:
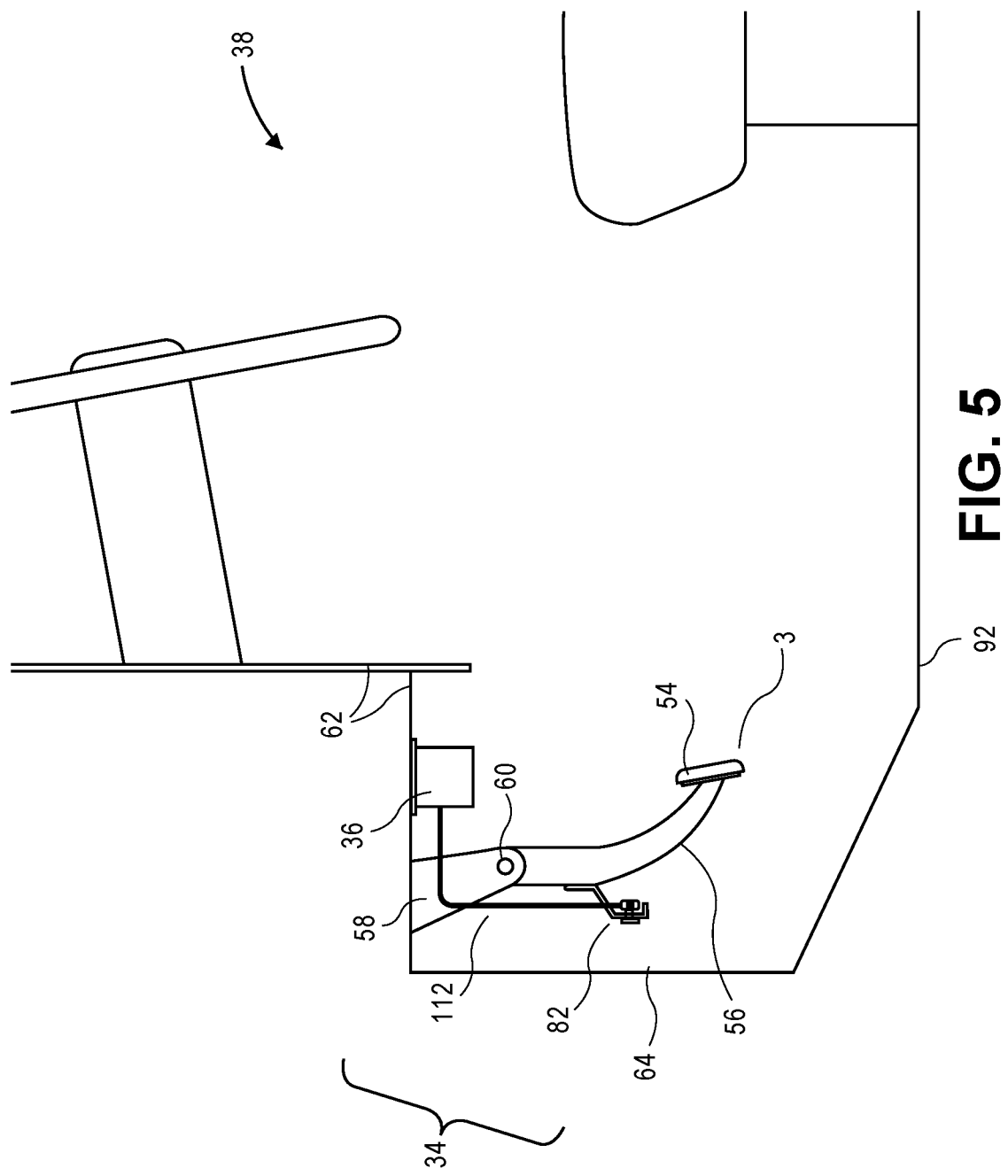
FIG. 5 is a schematic drawing showing a second embodiment of the supplemental brake monitor.

The supplemental braking monitor 34 will now be discussed in greater detail. Two exemplary installment layouts of the supplemental braking monitor 34 is shown in FIGS. 4-5. It should be appreciated that typically a supplemental brake application apparatus 32 (such as illustrated in FIGS. 2-3) will be installed with a supplemental braking monitor 34 (such as illustrated in FIGS. 4-5). FIGS. 2-5 show only a single installed component for the sake of clarity to the reader. In embodiments of the invention, various combinations may be used.

The supplemental braking monitor 34 is configured to be installed in the towed vehicle 14. Similar to the supplemental braking application apparatus 32, the supplemental braking monitor 34 may be permanently or removably installed in the towed vehicle 14. The supplemental braking monitor 34 is configured to monitor the status of the supplemental braking application apparatus 32, the brake pedal 30, and/or the actual braking of the towed vehicle 14. It should be appreciated that the supplemental braking application apparatus 32 may fail for any of various reasons, either at the fault of or no fault of the user. For example, the supplemental braking application apparatus 32 may be dislodged or uninstalled, the supplemental braking application apparatus 32 may be improperly installed such that it does not actually actuate the brake pedal 30, the supplemental braking application apparatus 32 may lose power or indications that the brake in the towing vehicle 12 is being applied, the driver may forget to install the supplemental braking application apparatus 32, or other failings. These failings may happen before or during the towing process. As such, the supplemental braking monitor 34 provides a status of the braking of the towed vehicle 14 to the vehicle driver, to alert the driver of a potentially dangerous situation.

In embodiments of the invention, the supplemental braking monitor 34 comprises a proximity sensor 82 and a mounting plate 84. The mounting plate 84 is configured to secure the supplemental braking monitor 34 into a position and orientation such that the proximity sensor 82 can observe an object or surface indicative of the braking of the towed vehicle 14. The proximity sensor 82 provides an indication that the braking is actually being performed. As an example scenario, the supplemental brake application apparatus 32 may be setup incorrectly or conditions in the trail vehicle may change (for example, the position of the front seat may be moved). In these instances, the supplemental brake application apparatus 32 may be either continuously applying the brakes. Continuous application causes brake fluid to get hot and expand. The expanded brake fluid applies the brakes harder. Eventually this can catch the towed vehicle on fire due to the very hot brakes. By detecting the position of the brake pedal 30 (either directly or indirectly), this example scenario and others (such as the brakes being never applied) can be avoided.

In some embodiments, the supplemental braking monitor 34 comprises the proximity sensor 82, a sensor target 86, and a sensor cable 88. The proximity sensor 82 is configured for mounting to the structure of the towed vehicle 14 on the firewall 64 under the dashboard 62 and forward of the towed vehicle 14 brake pedal 30. The sensor target 86 is configured for mounting on the towed vehicle 14 brake pedal 30. The supplemental braking monitor 34 is configured for mounting under the dashboard 62 and configured for connecting to the proximity sensor 82 with the sensor cable 88.

The proximity sensor 82 is configured to produce a proximity detection signal. The proximity detection signal is based at least in part on movement of the brake pedal 30. The proximity detection signal may be an electrical signal, an optical (e.g., infrared) signal, a mechanical signal, or other type of signal capable of conveying information. The proximity detection signal may be binary (either detected or not detected) or incremental (reflecting a degree of actuation). For example, the proximity detection signal may be indicative of a degree to which the brake is applied (such as by percentage or fraction of a total actuation at the second position), or otherwise indicative of a level of braking intensity. In some embodiments of the invention, the proximity detection signal is produced continually by the proximity sensor 82. In other embodiments of the invention, the proximity detection signal is produced only upon the proximity sensor 82 detecting that the brake pedal 30 is moved to a braking position (e.g., the second position and/or the intermediate positions described above). In still other embodiments of the invention, the proximity detection signal is produced continuously until the brake pedal 30 is moved to a braking position. The proximity detection signal may be sent to the supplemental braking application apparatus 32, the towing monitor 22, a user computing device (such as a smart phone, not illustrated), or other device.

In embodiments of the invention, the supplemental braking monitor 34 comprises an upper housing 90 configured to protect the proximity sensor 82. In some embodiments, such as shown in FIG. 4, the supplemental braking monitor 34 is configured to be installed on a firewall 64, a floorboard 92, dashboard 62, or other static component of the interior 38 of the towed vehicle 14. In these embodiments, the proximity sensor 82 is oriented toward the brake pedal 30. The proximity sensor 82 may be oriented so that the brake pedal 30 moves toward and away from the proximity sensor 82, as illustrated, or the proximity sensor 82 may be oriented so that the brake pedal 30 moves perpendicular to the proximity sensor 82 (such that the brake pedal 30 enters and leaves a field of view of the proximity sensor 82), not illustrated. In other embodiments, such as shown in FIG. 5, the supplemental braking monitor 34 is configured to be installed on the brake pedal 30 and be oriented toward the firewall 64. In these embodiments, the proximity sensor 82 is oriented toward the firewall 64, floorboard 92, dashboard 62, supplemental braking application apparatus 32, or other static component of the interior 38 of the towed vehicle 14.

Figure 6:
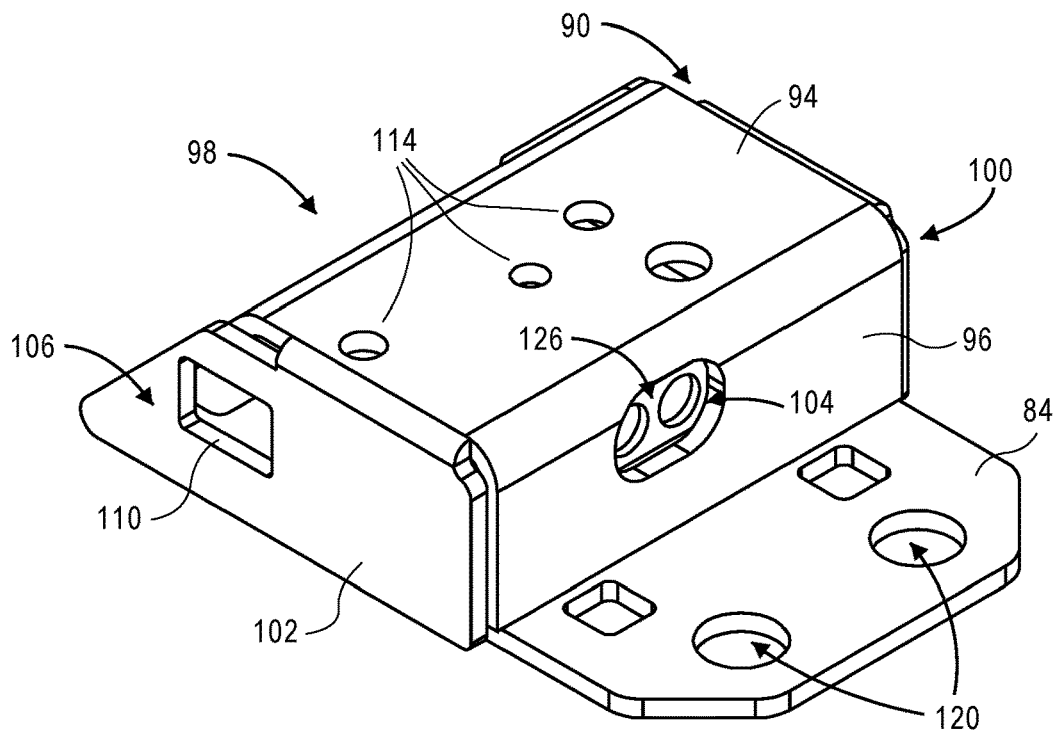
FIG. 6 is a perspective view of the supplemental brake monitor.
Figure 7A:
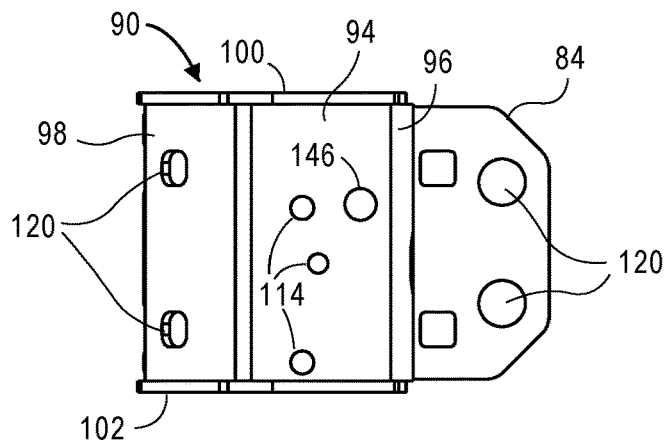
FIG. 7A is a top view of the supplemental brake monitor of FIG. 6.
Figure 7B:
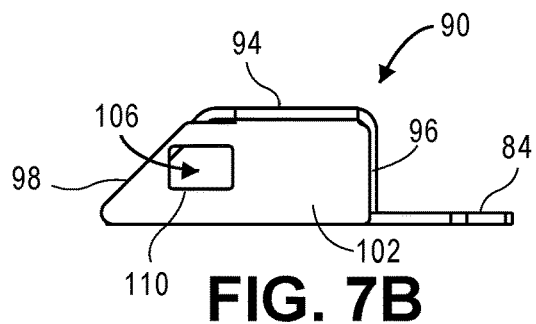
FIG. 7B is a right-side view of the supplemental brake monitor of FIG. 6.
Figure 7C:
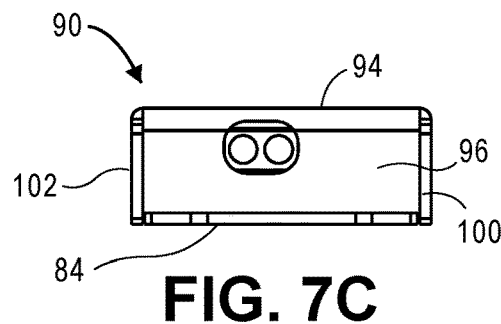
FIG. 7C is a front view of the supplemental brake monitor of FIG. 6.
Figure 8:
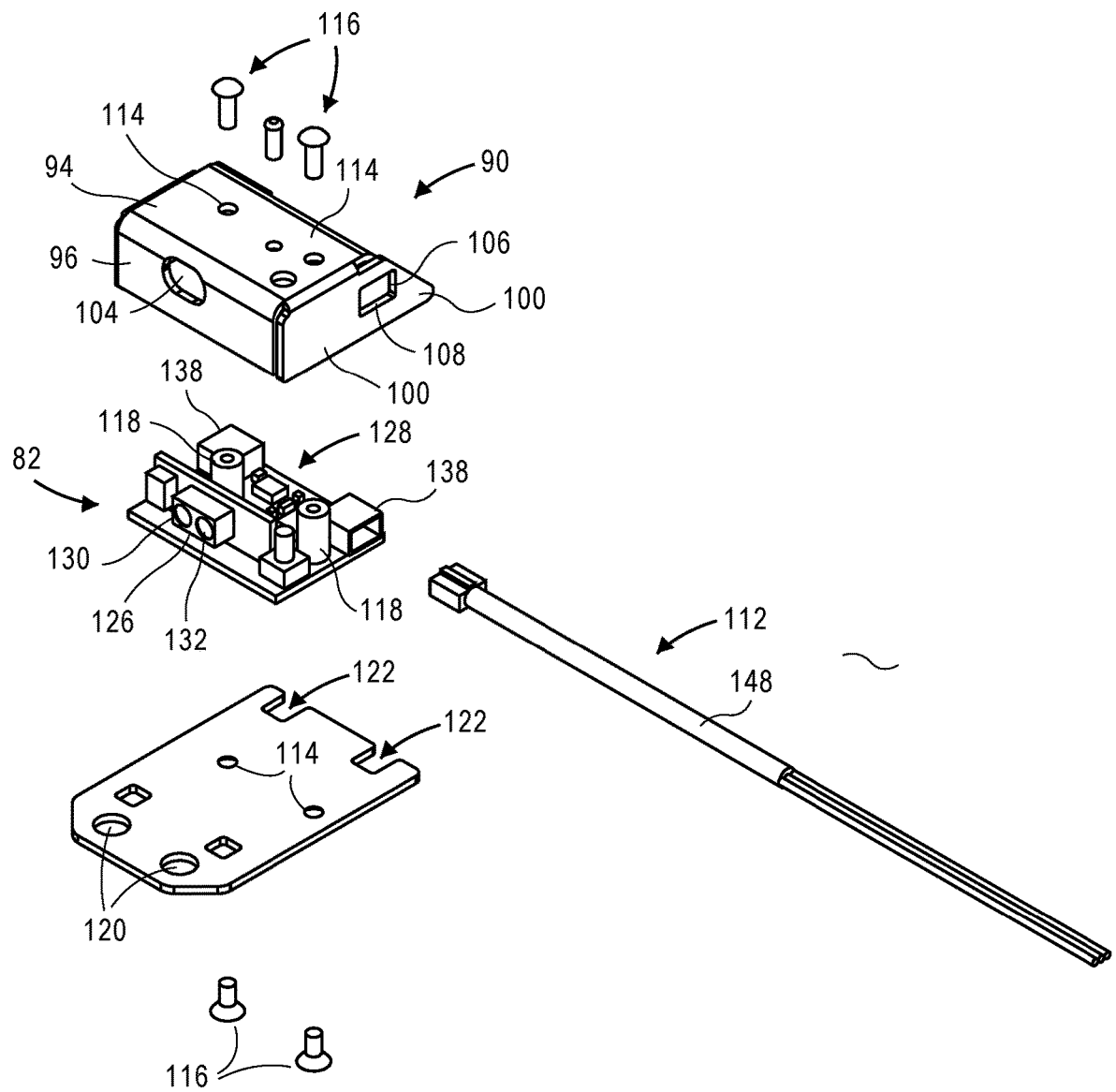
FIG. 8 is an exploded view of the supplemental brake monitor of FIG. 6.

FIGS. 6-8 illustrate an exemplary supplemental braking monitor 34. The exemplary supplemental braking monitor 34 is presented in perspective view (FIG. 6), top view (FIG.

7A), right side view (FIG. 7B), front view (FIG. 7C), and perspective exploded view (FIG. 8). It should be appreciated the figures illustrate an exemplary embodiment and the other embodiments may have other sizes and shapes.

In embodiments of the invention, as best illustrated in FIGS. 6 and 8, the supplemental braking monitor 34 comprises an upper housing 90, a mounting plate 84, and a sensor board. The sensor board is disposed between the upper housing 90 and the mounting plate 84. The sensor board includes the proximity sensor 82. The mounting plate 84 is configured to secure the supplemental braking monitor 34 to at least one component of the interior 38 of the towed vehicle 14. The upper housing 90 is configured to cover the sensor board over the mounting plate 84. The upper housing 90 protects the sensor board from external damage, while allowing the proximity sensor 82 to operate. The upper housing 90 and the mounting plate 84 may collectively be referred to as the "housing."

In embodiments of the invention, the upper housing 90 presents a general pentagonal prism shape. The upper housing 90 comprises a top side 94, a front side 96, a back side 98, a left side 100, and a right side 102. It should be appreciated that the preceding directional sides are exemplary and oriented on a reference frame aligned with a line-of-sight of the proximity sensor 82. The front side 96, the back side 98, the left side 100, and the right side 102 all extend from the top side 94 so as to present a void therein. The front side 96 may present a sensor opening 104 aligned with the proximity sensor such that the proximity sensor can detect objects through the front side 96 of the upper housing 90. The void is configured to receive the sensor board therein. The upper housing 90 may also present at least one cable opening 106 configured to allow the communication cable 112 to pass therethrough. The upper housing 90 may include a left-side cable opening 108 (as illustrated in FIG. 8) and a right-side cable opening 110 (as illustrated in FIG. 6). This allows an installer to insert a communication cable 112 into either the left side 100 or the right side 102 depending on the orientation of the installation and the destination of the sensor cable 88. The upper housing 90 may further include at least one fastener opening 114 for receiving a fastener 116 therein. The fastener 116 is secured through the fastener opening 114 into a fastener receptor 118 of the sensor board to secure the sensor board to the upper housing 90.

The mounting plate 84 of embodiments of the invention presents a general plate shape. In other embodiments of the invention, the mounting plate 84 may form another shape, such as that of a mounting bracket. In still other embodiments of the invention, the mounting plate 84 may be hingedly, clippedly, or permanently attached to the upper housing 90. In still other embodiments, the supplemental braking monitor 34 may include no mounting plate 84 such that the mounting is performed through the upper housing 90, with the sensor board being protected by the firewall 64, floorboard 92, dashboard 62, or other component of the towed vehicle 14.

The mounting plate 84 may present at least one fastener opening 114, at least one mounting opening 120, and at least one mounting recess 122 (or some combination thereof). The fastener opening 114 (like the fastener opening 114 of the upper housing 90) is configured to receive a fastener 116 so as to secure the sensor board to the upper housing 90 via the fastener receptor 118. The mounting recess 122 forms a mounting opening 120 when the upper housing 90 is secured adjacent to the mounting plate 84. The mounting opening 120 is configured to receive a fastener 116 therethrough for securing the mounting plate 84 (and by extension, the entire supplemental braking monitor 34). The fastener 116 received in the mounting opening 120 may include a threaded fastener (such as a screw or bolt), a retaining strap (such as a zip tie or rubber band), a clip, a retainer, or other mechanical fastener. Additionally or alternatively, a chemical adhesive may be used to secure the mounting plate 84 to the interior 38 of the towed vehicle 14.

In embodiments of the invention, the mounting plate 84 is configured to secure the proximity sensor 82 in more than one location and orientation. This allows the installer to select a location and orientation for the proximity sensor 82 based upon various factors such as the size and shape of the interior 38 of the towed vehicle 14 and the operation by the driver. As discussed above, the proximity sensor 82 is configured for sensing the distance between itself and the nearest solid object in line-of-sight. The proximity sensor 82 is further configured for transmitting a brake status signal about the towed vehicle 14 brake status based on this distance. Therefore, the installer will select a location and orientation for the mounting plate 84 such that the observed solid object will provide the indication based upon movement of the solid object or the supplemental braking monitor 34.

In some embodiments, the mounting plate 84 is configured to secure the supplemental braking monitor 34 to the brake pedal 30 and oriented toward the firewall 64 of the interior 38 of the towed vehicle 14 (as illustrated in FIG. 5). In other embodiments, the mounting plate 84 is configured to secure the supplemental braking monitor 34 in a position such that the proximity sensor 82 can detect movement of the brake pedal 30 (as illustrated in FIG. 4). For example, this may include securing the supplemental braking monitor 34 against the firewall 64, floorboard 92, dash or other interior 38 wall of the towed vehicle 14 and orienting the proximity sensor 82 toward the brake pedal 30. In these embodiments, the mounting plate 84 is configured to install in a location such that the brake pedal 30 moves toward and away from the location.

Returning to FIG. 4, in embodiments of the invention, the supplemental braking monitor 34 further comprises the sensor target 86 configured to be coupled to the brake pedal arm 56 of the brake pedal 30. The movement of the brake pedal 30 is detected by the proximity sensor 82 detecting a location of the sensor target 86 coupled to the brake pedal arm 56 of the brake pedal 30. In some embodiments, the sensor target 86 includes a reflective surface 124 configured to be oriented toward the proximity sensor 82. The reflective surface 124 is configured to be detectable by the proximity sensor 82. The sensor target 86 may be used to increase the cross-sectional area as viewed from the proximity sensor 82. The increased cross-sectional area allows the proximity sensor 82 to more reliably and accurately detect the movement of the brake pedal 30.

The sensor target 86 is configured for coupling to the towed vehicle 14 brake pedal 30 and configured for reflecting sensing energy from the proximity sensor 82. The towed vehicle 14 brake pedal 30 may be too thin where it intersects the line-of-sight of the proximity sensor 82 for the proximity sensor 82 to accurately sense the distance between it and the towed vehicle 14 brake pedal 30. The sensor target 86 may be formed with materials and with dimensions that ensure the ability of the proximity sensor 82 to sense the distance between the proximity sensor 82 and the sensor target 86 with sufficient accuracy and reliability under expected conditions. For instance, the surface of the sensor target 86 facing the proximity sensor 82 may have a coating that better reflects the sensing energy emitted from the proximity sensor 82 than does the underlying structural material of the sensor target 86 or the towed vehicle 14 brake pedal 30. The sensor target 86 may be configured for permanently coupling to the towed vehicle 14 brake pedal 30, or may be configured for detachable coupling to the towed vehicle 14 brake pedal 30. The sensor target 86 may be configured for detachable coupling can be mounted in different positions on the towed vehicle 14 brake pedal 30.

Figure 9:
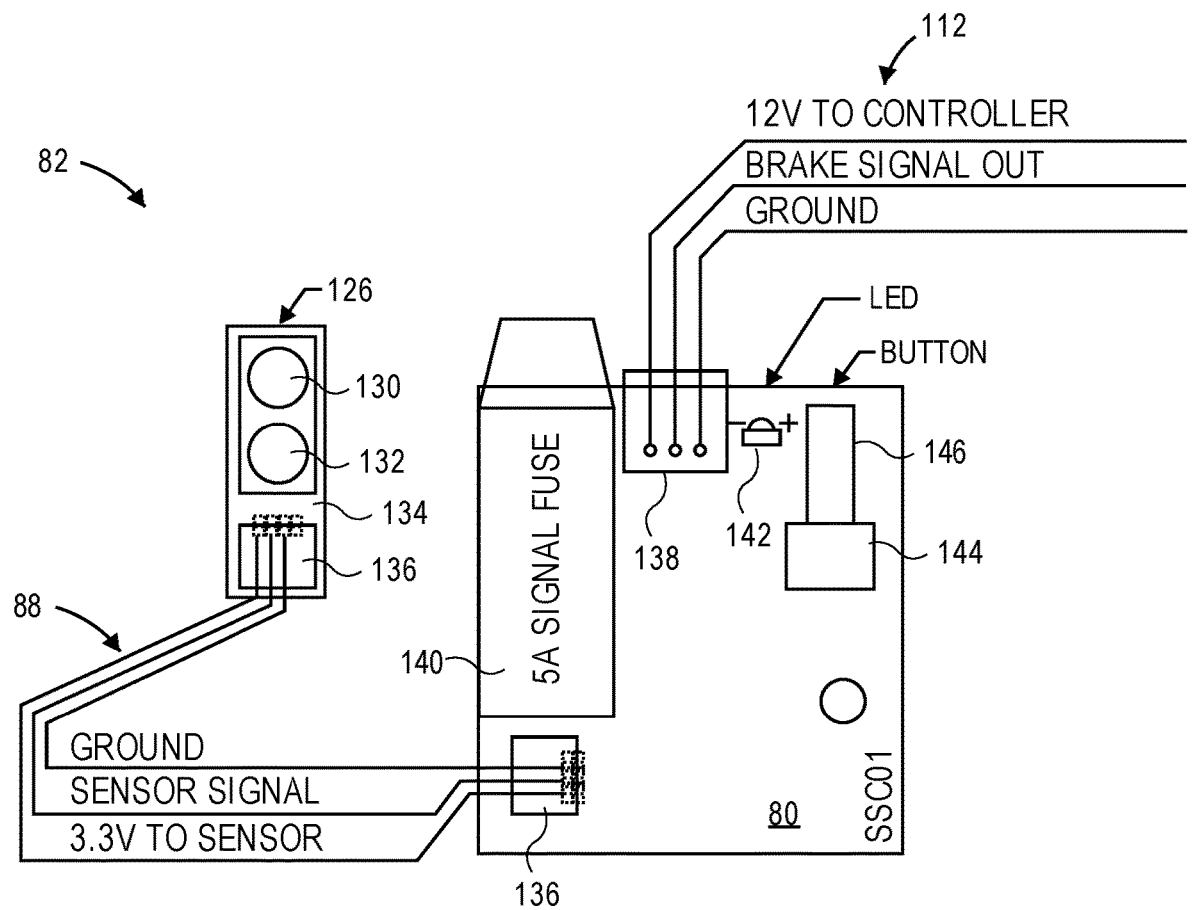
FIG. 9 is a schematic layout of the components of a sensor circuit.

Turning to FIGS. 8 and 9, the sensor board will be discussed in more detail. In embodiments of the invention, the proximity sensor 82 comprises a proximity sensor module 126 and a sensor controller 128. The proximity sensor module 126 is configured to transmit a burst of wireless electromagnetic energy, then receive reflections of this energy when it bounces off another object, such as the sensor target 86 or the firewall 64. Numerous different types and models of proximity sensor 82s may be utilized in various embodiments of the invention. For example, the proximity sensor 82 may be a Sharp® GP2YOA2 I YKOF distance measuring sensor unit. The proximity sensor module 126 may comprise an integrated combination of a position sensitive detector 130 ("PSD"), an infrared emitting diode 132 ("IRED"), and a signal processing circuit 134. Triangulation between the PSD 130 and the IRED 132 is used to determine distance to an object. The signal processing circuit 134 provides the proximity detection signal to the sensor controller 128 via the sensor cable 88 or other connection. As illustrated in FIG. 9, the sensor cable 88 may include a ground wire, a sensor signal wire, and a power wire (as labeled).

The sensor controller 128 may include a sensor port 136, an outlet port 138, a fuse 140, an indicator light 142, and a button 144 (which may include a button extension 146, as illustrated in FIG. 9). In some embodiments, the controller may further comprise a processor, and a memory (not illustrated). The sensor port 136 is configured to receive the sensor cable 88. The outlet port 138 is configured to receive the communication cable 112. The communication cable 112 may include a ground wire, a brake signal wire, and a power wire (as labeled). It should be appreciated that the sensor cable 88 and the communication cable 112 may each be encased in a casing 148 (as illustrated in FIG. 8).

The transmitter 36 will now be discussed in more detail. The transmitter 36 is configured to send a brake status signal to a towing vehicle 12. The brake status signal is based at least in part on the proximity detection signal. The proximity detection signal is sent by the proximity sensor module 126. In some embodiments, as illustrated in FIGS. 4 and 5, the transmitter 36 is a component of the supplemental braking monitor 34 such that the supplemental braking monitor 34 directly transmits information to the towing monitor 22. In some of these embodiments, the communication cable 112 is configured to be disposed between the supplemental braking monitor 34 and the towing monitor 22. In other of these embodiments, the transmitter 36 sends a wireless signal from the supplemental braking monitor 34 to the towing monitor 22. In other embodiments, not illustrated, the transmitter 36 is a component of the supplemental braking application apparatus 32, such that the supplemental braking application apparatus 32 receives the braking signal from the supplemental braking monitor 34 and transmits the signal to the towing monitor 22. In these embodiments, the communication cable 112 is configured to be disposed between the proximity sensor 82 and the supplemental brake application apparatus 32. As such, the proximity detection signal is sent via the communication cable 112 from the proximity sensor 82 to the supplemental brake application apparatus 32. The brake status signal is then sent to the towing monitor 22 from the supplemental braking application apparatus 32 (either wired or wirelessly).

Figure 10:
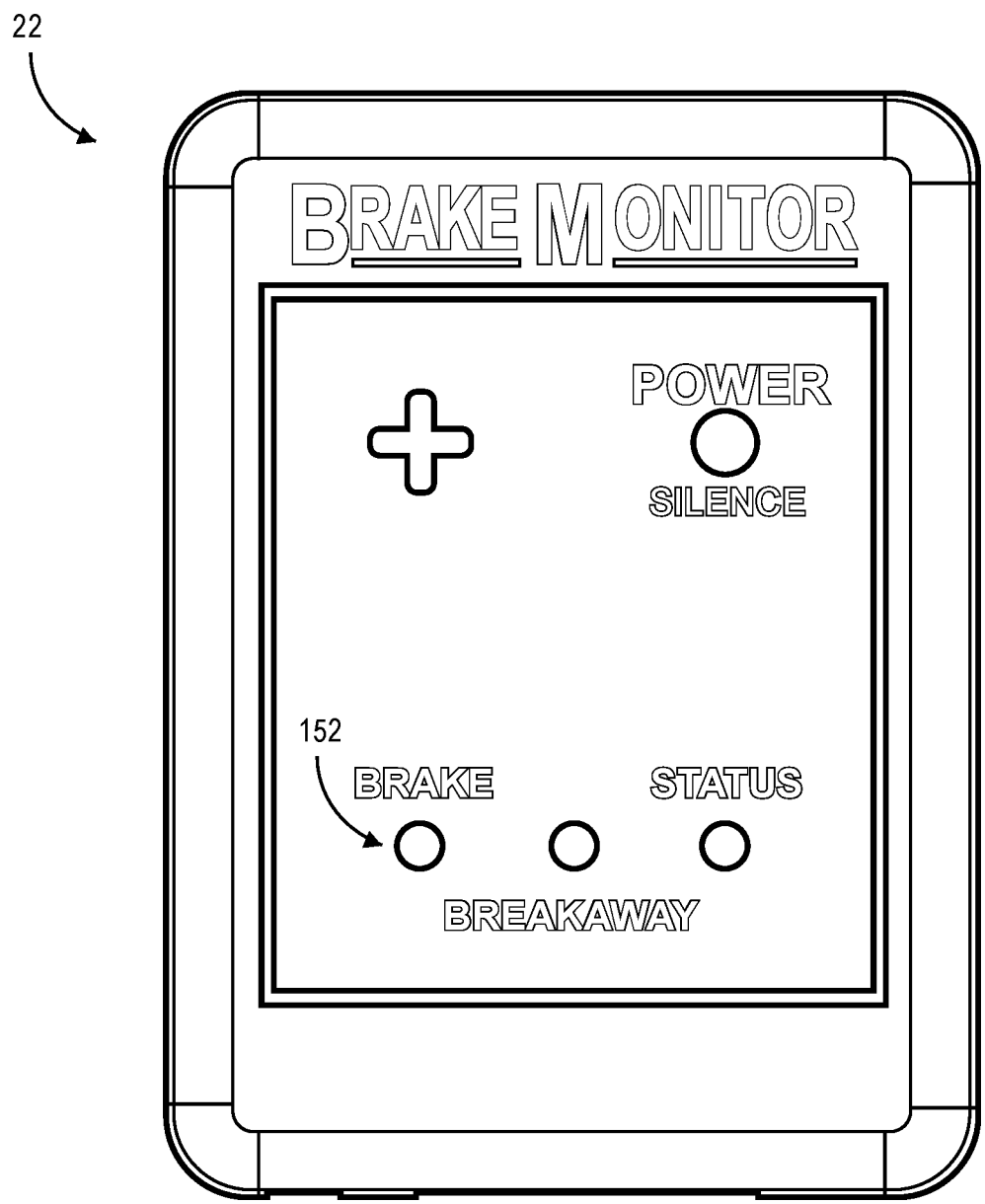
FIG. 10 is a top view of a towing monitor.

The towing monitor 22 (shown in FIGS. 1 and 10) will now be discussed in more detail. The towing monitor 22 is configured to be mounted in an interior 150 of the towing vehicle 12, typically in a position where the driver can see and hear it. The towing monitor 22 includes at least one indicator 152 configured to present a brake status indication to a driver in the towing vehicle 12. The indicator 152 may present binary information (either on or off, being indicative of the brake being applied or not applied, such as a light on or off) or graphical information (showing a degree of brake application, such as in words, numbers, colors, shapes, or other graphical representation). The brake status indication is based at least in part on the brake status signal from the transmitter 36 received by the towing monitor 22. As such, the brake status indication provides information to the driver that the supplemental braking application apparatus 32 is actually applying the brake in the towed vehicle 14.

The brake status indication may be visual (such as a light), audio (such as a buzzer or speaker), or a combination of visual and audio indications. The brake status indication could also be tactile. In some embodiments, the towing monitor 22 is configured for receiving signals from the supplemental braking monitor 34 regarding the detection of braking as well as a break-away condition (discussed below). In some embodiments, the towing monitor 22 is configured to illuminate a light for braking and audible alarm along with a light for the break-away condition. The towing monitor 22 may also include an extended braking duration timer that will provide audible indication with unique alarm. The towing monitor 22 may also include a status indication and a power indication. The towing monitor 22 may include a power cord 42 (not illustrated) that is configured for plugging into a power source of the towing vehicle 12 or may include an internal battery (not illustrated).

Returning to FIG. 1, the supplemental braking system 24 may have a break-away system 154 that is configured to send a signal to supplemental braking system 24 to apply the brakes of the towed vehicle 14 in the event the towed vehicle 14 becomes decoupled from the towing vehicle 12. The towed vehicle 14 would be at great risk of causing damage to itself, other cars, and people if it becomes decoupled from the towing vehicle 12 while traveling at speed. The signal from the break-away system 154 causes the supplemental braking system 24 to apply the brakes of the towed vehicle 14, bringing the towed vehicle 14 to a rapid halt.

In other embodiments, not illustrated, the proximity sensor 82 is mounted in the towed vehicle 14 and directly communicates to the towing monitor 22. The proximity sensor 82 obtains its electrical power from the battery of the towing vehicle 12 via the towing monitor 22. This arrangement allows for monitoring of the brake status of the towed vehicle 14 regardless of whether the ignition of the towed vehicle 14 is on or even if the towed vehicle 14 has power at all. In other embodiments, the proximity sensor 82 may obtain its power directly from the battery of the towing vehicle 12, bypassing the towing monitor 22 or it may have its own internal battery.

Although the invention has been described with reference to the embodiments illustrated in the attached drawing figures, it is noted that equivalents may be employed and substitutions made herein without departing from the scope of the invention.

Having thus described various embodiments of the invention, what is claimed as new and desired to be protected by Letters Patent includes the following:

1. A supplemental braking system comprising:
   a supplemental brake application apparatus configured to be installed in a towed vehicle,
   wherein the supplemental brake application apparatus is configured to move a brake pedal of the towed vehicle between a first position and a second position;
   a supplemental braking monitor for installation in the towed vehicle,
   said supplemental braking monitor including—
      a proximity sensor configured to produce a proximity detection signal,
      a mounting plate configured to secure the proximity sensor in a position such that the proximity sensor can detect movement of the brake pedal of the towed vehicle,
      wherein the proximity detection signal is based at least in part on movement of the brake pedal of the towed vehicle; and
   a transmitter configured to send a brake status signal from the towed vehicle to a towing vehicle,
   wherein the brake status signal is based at least in part on the proximity detection signal.

2. The supplemental braking system of claim 1, wherein the mounting plate is configured to install the proximity sensor adjacent to an interior wall of the towed vehicle.

3. The supplemental braking system of claim 1, wherein the mounting plate is configured to install in a location such that the brake pedal moves toward and away from the location.

4. The supplemental braking system of claim 1, wherein the supplemental braking monitor further comprises:
   a sensor target configured to be coupled to a pedal arm of the brake pedal,
   wherein movement of the brake pedal is detected by the proximity sensor detecting a location of the sensor target coupled to the pedal arm of the brake pedal.

5. The supplemental braking system of claim 4,
   wherein the sensor target includes a reflective surface configured to be oriented toward the proximity sensor,
   wherein the reflective surface is configured to be detectable by the proximity sensor.

6. The supplemental braking system of claim 1, further comprising:
   a communication cable configured to be disposed between the proximity sensor and the supplemental brake application apparatus,
   wherein the proximity detection signal is sent via the communications cable from the proximity sensor to the supplemental brake application apparatus.

7. The supplemental braking system of claim 6, wherein the transmitter is associated with the supplemental brake application apparatus.

8. The supplemental braking system of claim 1, further comprising:
   a towing monitor configured to be emplaced in the towing vehicle,
   wherein the towing monitor is configured to receive said brake status signal from a wireless transmitter.

9. The supplemental braking system of claim 8,
   wherein the towing monitor includes an indicator configured to present a brake status indication to a driver in the towing vehicle,
   wherein the brake status indication is based at least in part on the brake status signal from the transmitter received by the towing monitor.

10. A supplemental braking monitor configured to be for installation in a towed vehicle, the supplemental braking monitor comprising:
   a proximity sensor configured to produce a proximity detection signal; and
   a mounting plate configured to secure the proximity sensor in a position such that the proximity sensor can detect movement of the brake pedal of the towed vehicle,
   wherein the proximity detection signal is produced at least in part based on movement of the brake pedal of the towed vehicle.

11. The supplemental braking monitor of claim 10, wherein said movement of the brake pedal is performed by a supplemental brake application apparatus installed in the vehicle.

12. The supplemental braking monitor of claim 10, further comprising:
   a transmitter configured to send a brake status signal from the towed vehicle to a towing monitor associated with a towing vehicle,
   wherein the brake status signal is based at least in part on the proximity detection signal.

13. The supplemental braking monitor of claim 10, wherein the mounting plate is configured to install the proximity sensor adjacent to an interior wall of the vehicle.

14. The supplemental braking monitor of claim 10, wherein the mounting plate is configured to install in a location such that the brake pedal moves toward and away from the location.

15. The supplemental braking monitor of claim 10, further comprising:
   a sensor target configured to be coupled to a pedal arm of the brake pedal,
   wherein movement of the brake pedal is detected by the proximity sensor detecting a location of the sensor target coupled to the pedal arm of the brake pedal.

16. The supplemental braking monitor of claim 15,
   wherein the sensor target includes a reflective surface configured to be oriented toward the proximity sensor,
   wherein the reflective surface is configured to be detectable by the proximity sensor.

17. The supplemental braking monitor of claim 10, further comprising:
   a towing monitor configured to be emplaced in the towing vehicle,
   wherein the towing monitor is configured to receive said brake status signal from a wireless transmitter of the supplemental brake monitor,
   wherein the towing monitor includes an indicator configured to present a brake status indication to a driver in the towing vehicle,
   wherein the brake status indication is based at least in part on the brake status signal from the transmitter received by the towing monitor.

18. A supplemental braking system comprising:
   a supplemental brake application apparatus configured to be installed in a towed vehicle,
   wherein the supplemental brake application apparatus is configured to move a brake pedal of the towed vehicle between a first position and a second position; and
   a supplemental braking monitor for installation in the towed vehicle,
   said supplemental braking monitor including— a proximity sensor configured to produce a proximity detection signal, a mounting plate configured to secure the proximity sensor in a position such that the proximity sensor can detect movement of the brake pedal of the towed vehicle, wherein the proximity detection signal is based at least in part on movement of the brake pedal of the towed vehicle.

19. The supplemental braking system of claim 18, further comprising:

a transmitter configured to send a brake status signal from the towed vehicle to a towing vehicle, wherein the brake status signal is based at least in part on the proximity detection signal.

20. The supplemental braking system of claim 19, further comprising:

a communication cable configured to be disposed between the proximity sensor and the supplemental brake application apparatus, wherein the proximity detection signal is sent via the communications cable from the proximity sensor to the supplemental brake application apparatus, wherein the transmitter is associated with the supplemental brake application apparatus.

* * * * *